United States Patent [19]

Hage

[11] 4,192,607
[45] Mar. 11, 1980

[54] APPARATUS FOR SELECTIVELY COPYING DOCUMENTS FROM TWO DIFFERENT DOCUMENT FEEDERS

[75] Inventor: Charles T. Hage, Rochester, N.Y.

[73] Assignee: Eastman Kodak Company, Rochester, N.Y.

[21] Appl. No.: 924,106

[22] Filed: Jul. 12, 1978

[51] Int. Cl.[2] .................... G03B 27/48; G03B 27/50
[52] U.S. Cl. .......................................... 355/50; 271/9; 271/291; 355/3 SH; 355/14 SH; 271/301; 271/303
[58] Field of Search ............... 271/9, 64, 186; 355/50, 355/51, 14, 3 SH, 3 R

[56] References Cited

U.S. PATENT DOCUMENTS

| Re. 27,976 | 4/1973 | Sahley | 355/64 |
|---|---|---|---|
| 3,390,634 | 7/1968 | Verderber | 101/463 |
| 3,448,970 | 6/1969 | Kolibas | 355/57 |
| 3,498,712 | 3/1970 | Kolibas et al. | 355/57 |
| 3,504,973 | 4/1970 | Kolibas et al. | 355/75 |
| 3,612,682 | 10/1971 | Shelffo et al. | 355/14 |
| 3,754,820 | 4/1973 | Shelffo et al. | 355/3 R |
| 3,827,803 | 8/1974 | Schelffo et al. | 355/3 R |
| 3,833,296 | 9/1974 | Vola et al. | 355/51 |
| 3,861,306 | 1/1975 | DuBois et al. | 101/450 |
| 3,914,047 | 10/1975 | Hunt, Jr. et al. | 355/16 |
| 3,957,368 | 5/1976 | Goshima et al. | 355/51 X |
| 4,076,408 | 2/1978 | Reid et al. | 355/14 |
| 4,095,979 | 6/1978 | DiFrancesco et al. | 355/3 R |
| 4,099,150 | 7/1978 | Connin | 271/9 X |
| 4,099,860 | 7/1978 | Connin | 355/14 |

FOREIGN PATENT DOCUMENTS

946460 4/1974 Canada.

Primary Examiner—Richard A. Wintercorn
Attorney, Agent, or Firm—G. Herman Childress

[57] ABSTRACT

Documents are fed to a platen of a copier from two different feeding apparatus, one of which is a recirculating feeder adapted to sequentially feed a plurality of document sheets from one document to the platen for copying each sheet in a known manner. Typically the recirculating feeder is used in making most of the copies, and it may be used to keep the machine running substantially continuously. The platen also can receive one or more sheets of another document from a document positioner. For example, the positioner can feed a document sheet that is too large to be accommodated by the recirculating feeder, or it can feed a document sheet that may not be reliably handled by the recirculating feeder (such as a document sheet made by assembling copy onto a backing sheet), or the positioner can feed documents comprising a single sheet. Also, the positioner can be used for making document masters that are then copies using the recirculating feeder. A logic and control unit for the copier temporarily interrupts a job being run from the recirculating feeder when a second job is to be run from the document positioner. After the second job is complete, the logic and control unit restarts the job in the recirculating feeder.

5 Claims, 4 Drawing Figures

APPARATUS FOR SELECTIVELY COPYING DOCUMENTS FROM TWO DIFFERENT DOCUMENT FEEDERS

CROSS REFERENCE TO RELATED APPLICATIONS

Reference is made to the following commonly assigned, copending U.S. Patent Applications: Ser. No. 647,683, filed Jan. 8, 1976, which is a continuation of Application Ser. No. 523,610, filed on Nov. 13, 1974 in the name of M. J. Russel and entitled RECIRCULATING SHEET FEEDER; Ser. No. 901,922, filed May 1, 1978, which is a continuation of Application Ser. No. 768,666, filed Feb. 14, 1977 in the name of A. B. DiFrancesco et al and entitled APPARATUS FOR PRODUCING COLLATED COPIES IN PAGE SEQUENTIAL ORDER, now U.S. Pat. No. 4,158,500, issued June 19, 1979; and Ser. No. 768,665, filed Feb. 14, 1977 in the name of A. B. DiFrancesco et al and entitled METHOD AND APPARATUS FOR PRODUCING DUPLEX COPIES, now U.S. Pat. No. 4,095,979, issued June 20, 1978.

BACKGROUND OF THE INVENTION

Field of the Invention

This invention relates to reproduction apparatus in general and, more specifically, to copier/duplicators or the like. More specifically, the invention relates to the structure and control of a copier/duplicator so that two documents from two document feeders can be selectively copied.

Description of the Prior Art

Copier/duplicators typically comprise a platen against which an original document is positioned for copying. The document is exposed while on the platen and an image of the document is projected onto a photoconductor where the image is developed. The image then is transferred to a copy sheet and fused to the copy sheet. Document positioners are known for feeding individual document sheets to a platen for copying and then for feeding the sheets to a storage area. A typical feeder of this type is disclosed in U.S. Pat. No. 3,844,552 which issued on Oct. 29, 1974 in the names of Bleau et al. It is also known to provide recirculating document feeders which repetitively feed sheets of a multi-sheet document from a stack to the platen and then away from the platen so that the copier produces collated sets of copies without collating apparatus. Examples of such document feeders are disclosed in the related copending U.S. Patent Applications referenced above and in U.S. Pat. No. RE 27,976.

Recirculating document feeders as disclosed in such copending applications provide significant improvements in the copying operation, especially in regard to the convenience to the user and the ability to make collated sets of copies without the need for a collator. However, when a user wishes to make copies of an original document too large for the feeder, or when the original document is prepared by pasting or otherwise assembling various portions of the document onto a backing sheet, the original may not feed reliably through the recirculating feeder. Also, some documents to be copied comprise one or only a few pages, and one or only a few copies of each page is required. In some cases the recirculating feeder can be stopped and then swung away from the platen to manually place directly onto the platen the page or pages of the document that are to be copied, and then one or more copies of the original can be made in the usual manner. One or more "master" copies can be made in this manner from documents not suitable for use in the recirculating feeder, and the "master" copies thus produced are placed in the recirculating feeder for the production of collated sets of copies. However, it is somewhat inconvenient to move the recirculating feeder away from the platen, and the time required in converting from one mode of operation to another reduces the potential usage level of the copier. Clearly, it would be advantageous to be able to make copies from oversize originals, paste-up documents or from other documents without having to manually interrupt the job being run on the recirculating feeder, swing the feeder away from the platen, make the required number of copies of the over-size or paste-up originals, and then reposition and restart the recirculating feeder operation. Also, when a long job is being run on a copier, it is desireable to be able to interrupt that job and run a short job, or one with a higher priority, with a minimum of inconvenience to the operator.

Apparatus have been provided for making masters in a separate part of the copying apparatus and then feeding the master onto a cylinder or the like where a multitude of copies are made from the master in the usual manner. For example, see Canadian Pat. No. 946,460. This patent also discloses concurrently processing a master while copies are made from a preceeding master, and for delaying preparations of the second master until the printing time remaining in the printing run from the first master is about equal to the time required to make the second master. Other apparatus of this general type are disclosed in U.S. Pat. Nos. 3,612,682; 3,754,820; 3,827,803; 3,861,306 and 3,390,634. In addition, apparatus for making masters by means of an electrophotographic process are disclosed in a number of patents, including U.S. Pat. Nos. 3,448,970; 3,498,712 and 3,504,973.

SUMMARY OF THE INVENTION

The invention relates to apparatus for feeding document sheets to an exposure station from two spaced locations. Paths extend from the two locations to the exposure station. Means are provided for feeding document sheets along the paths. Control means operate the feeding means in a programmed sequence which assures that documents from the two locations are fed to said platen from first one location and then from another location.

The invention and its advantages will become more apparent in the detailed description of the preferred embodiments presented below.

BRIEF DESCRIPTION OF THE DRAWINGS

In the detailed description of the preferred embodiment of the invention presented below, reference is made to the accompanying drawings, in which.

DESCRIPTION OF THE PREFERRED EMBODIMENT

Figure 1:
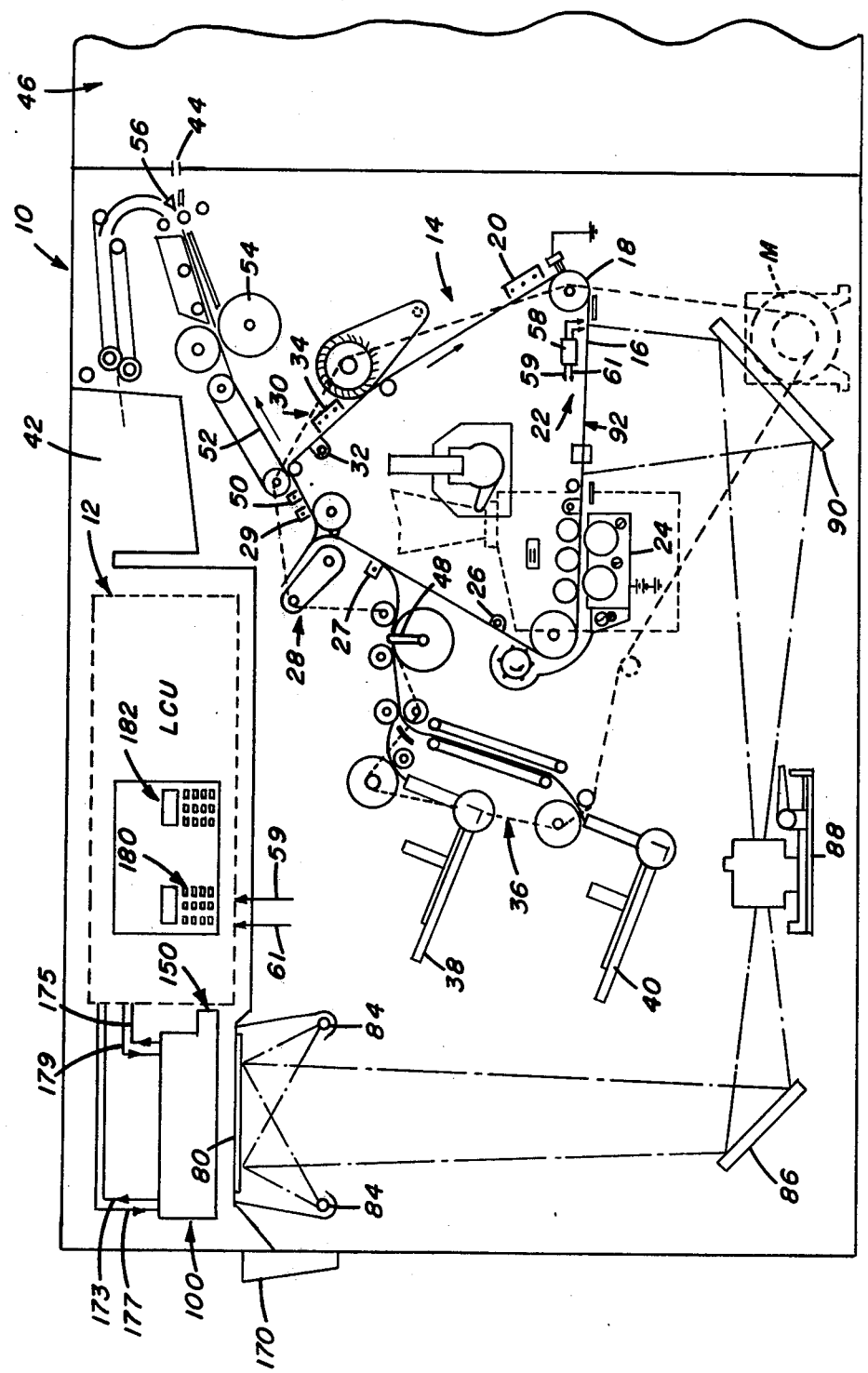
FIG. 1 is a schematic representation of a preferred embodiment of copier apparatus of this invention.

Referring now to the drawings, FIG. 1 illustrates a copier 10 having a logic and control unit (LCU) 12 which monitors and controls various elements of the copier as described in more detail later. The copier includes a process section 14 having a photoconductor 16 trained to run in a closed-loop path about a plurality of rollers. One of these rollers 18 is coupled to a drive motor M so that the photoconductor is driven in a clockwise direction. In its closed loop path when the motor is connected to an appropriate source of potential. This movement of the photoconductor causes successive image frames on the photoconductor sequentially to pass adjacent a series of electrophotographic work stations which, for the purpose of this disclosure, can be described as follows:

- a charging station 20 at which the photoconductor is sensitized by receiving a uniform electrostatic charge;
- an exposing station 22 at which the photoconductor receives a latent electrostatic image by projecting a light pattern representing the document sheet onto the sensitized photoconductor;
- a developing station 24 at which the latent electrostatic image is rendered visible by the application of toner;
- a post development erase station 26 at which the photoconductor is illuminated to remove the residual charge on the photoconductor;
- a first image transfer station 27 at which the developed and visible image is electrostatically transferred from the photoconductor to one side of a copy support;
- a copy sheet inverter station 28 which lifts the copy sheet from the photoconductor and then returns it to the photoconductor in a manner which inverts the sheet (e.g., as disclosed in the before-mentioned copending U.S. Pat. No. 4,095,979); a second image transfer station 29 at which a second developed and visible image is electrostatically transferred from the photoconductor to the second side of the copy support; and
- a cleaning station 30, including erase and discharging devices 32 and 34, respectively, at which the photoconductor is cleaned of any residual marking particles or electrostatic charge.

A copy handling mechanism 36 moves copy supports, such as paper, in a path from either of two supply hoppers 38 and 40, through the transfer stations 27 and 29, and on to either a delivery hopper 42, where the copies are deposited for retrieval by the operator, or an exit 44, where the copies can be delivered to a finisher 46 for suitable finishing operations, such as jogging, stapling and stacking. Additional stations located along this path of movement include the following:

- a registration device 48 for establishing proper alignment between the copy supports in the copy handling mechanism and the image frame of the photoconductor;
- a discharging device 50 for reducing electrostatic attraction between the copy supports and the photoconductor in order to facilitate separation of the copy supports from the photoconductor; a suitable transport 52 for the unfused copy supports;
- a fusing device 54 for permanently fixing the toner to the copy support by the application of heat and pressure; and
- a sheet diverter 56 for directing the copy supports to either the delivery hopper 42 or exit 44.

The logic and control unit 12 coordinates operation of the various copier stations with movement of the copy supports and the latent and visible images on the photoconductor. To facilitate this coordination, the photoconductor is provided with a plurality of perforations, not shown, adjacent one of its edges. Means 58 adjacent the photoconductor sense the perforations. As explained in more detail later, sensing means 58 preferably senses two sets of perforations designated C and F perforations. Signals from the sensing means are furnished to the logic and control unit 12 by leads 59 and 61. Additional sensors are provided in the copy path. In this manner input signals can be generated to which the LCU can respond for sequentially operating the work stations as well as for controlling the operation of many other machine functions. A more complete description of suitable means for coordinating operations in a copier is disclosed in U.S. Pat. No. 3,914,047, entitled SYNCHRONIZING CONTROL APPARATUS FOR ELECTROPHOTOGRAPHIC APPARATUS UTILIZING DIGITAL COMPUTER and issued in the names of William E. Hunt, Jr., et al on Oct. 21, 1975.

Figure 2:
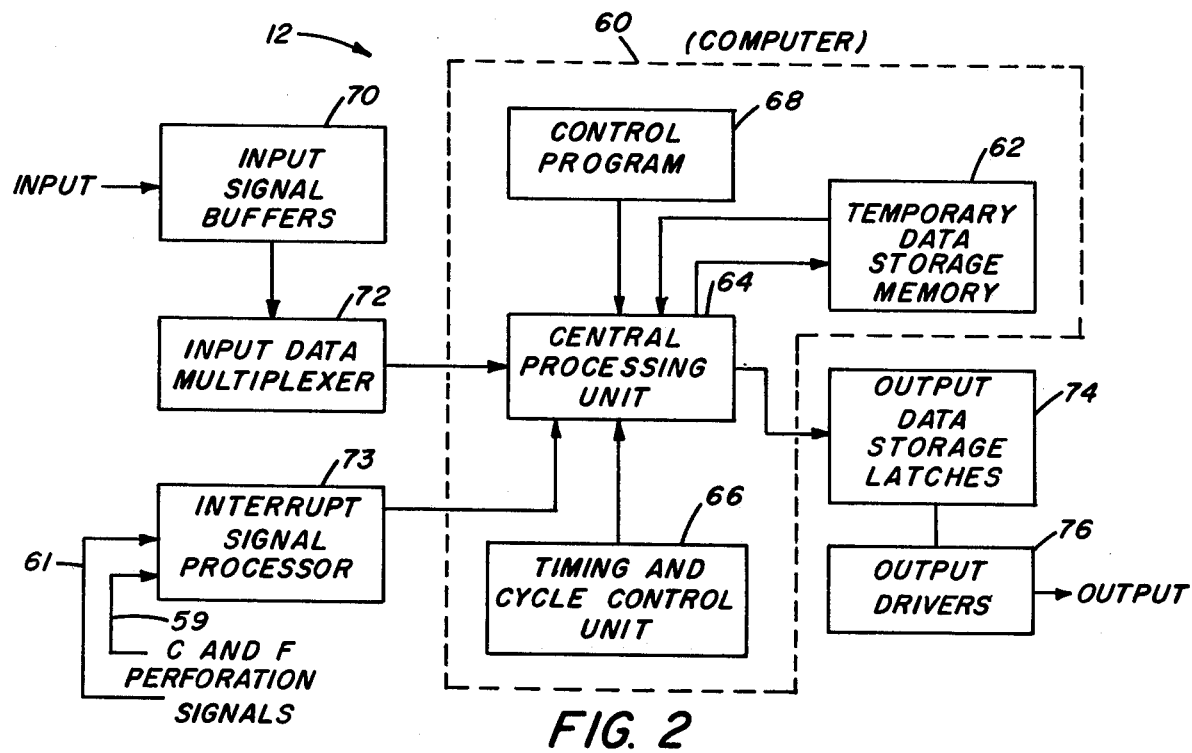
FIG. 2 is a block diagram of a logic and control unit for the copier shown in FIG. 1.

The logic and control unit 12 could be implemented by numerous suitable mechanisms such as relays, transistors, or small and medium scale digital integrated circuits. In this particular embodiment, a microcomputer 60 is utilized. FIG. 2 shows a block diagram of a typical logic and control unit (LCU) 12 which interfaces with the copier 10 and related apparatus. The LCU 12 consists of temporary data storage memory 62, central processing unit 64, timing and cycle control unit 66, and stored program control 68. Data input and output is performed sequentially under program control. Input data is applied to the central processing unit through input signals, buffers 70 and a multi-plexer 72. The input signals to the signal buffers 70 consist of logic level digital signals which are derived from various switches, sensors, and analog-to-digital converters. Input data also is applied from perforation sensor 58 and leads 59, 61 to an interrupt signal processor 73 and then to the central processing unit 64.

The output data and control signals are applied to storage latches 74 which provide inputs to suitable output drivers 76 directly coupled to leads which, in turn, are connected to the work stations. More specifically, the output signals from the LCU 12 are logic level digital signals which are buffered and amplified to provide drive signals to various clutches, brakes, solenoids, power switches, and numeric displays in various portions of the apparatus described herein.

The LCU processing functions can be programmed by changing the instructions stored in the computer memory. This programming technique provides a flexible machine logic and timing arrangement and extends the LCU capability to include the capacity for performing error diagnostics. For example, if an input signal is not delivered to the LCU at the appropriate time, the LCU can display an ERROR code on a control panel or shut down the machine operation. The ERROR code indicates a machine failure. During a copy cycle, the LCU executes the stored program which controls the processing of signal inputs to the LCU and initiates turn ON, turn OFF, and timing of output control signals.

The time sequence of machine control signals (often referred to in the art as events) is critical to the copy cycle because the copier and feeder stations and associated mechanisms must be powered ON and OFF in the correct sequence to assure high quality copying and to prevent paper misfeeds, misregistration, and erratic operation. The primary purpose for controlling the time sequence of events and their relationship to each other is, as noted above, to sense perforations which correspond to the location of the image frames on the photoconductor as these elements continue through the cycle in an endless path. For example, the photoconductor may be divided into six image areas by one set of perforations (F perforations); and each image area may be subdivided by another set of perforations (C perforations). These F and C perforations (not shown) are described in more detail in the above-mentioned U.S. Pat. No. 3,914,047. As previously mentioned, these sets of perforations are detected by sensing means 58, and related signals are furnished to the LCU 12 by leads 59 and 61.

Returning now to the computer, the program 68 may be embodied by a Read Only Memory (ROM). The ROM contains the operational program in the form of instructions and fixed binary numbers corresponding to numeric constants. These programs are permanently stored in the ROM and cannot be altered by the computer operation. Typically, the ROM is programmed at the manufacturer's facility, and the instructions programmed provide the required control functions such as: sequential control, jam recovery, operator observable logic, machine timing, and automatic document rearrangement.

The temporary storage memory 62 may be conveniently provided by a conventional Read/Write Memory. Data such as: copy requested count, copies processed count, and copies delivered count are stored in the RAM until successful completion of a copy cycle. The RAM is also used to store data operated on by the computer and to store the results of computer calculations.

The copier has a platen 80 against which documents can be positioned for copying. A document on platen 80 is illuminated by flash lamps 84. An image of the document is reflected by a mirror 86 to a lens 88, projected by the lens to a second mirror 90 and reflected to an image plane 92 formed along a flat portion of the photoconductor 16 in the area of the exposing station 22.

In accordance with the present invention document sheets are fed to the platen 80 by apparatus comprising two different types of document feeders. Preferably the apparatus comprises a recirculating document feeder in combination with a document positioner. The recirculating feeder typically is used for making collated sets of copies of the document by recirculating each document sheet to the platen for copying. The document positioner normally is used for making a single copy, or only a few copies, of documents comprising a single document sheet or only a few document sheets that are fed to the platen only once for making the required number of copies. The operation of the two feeding apparatus is controlled in a manner which provides priority of copying to documents fed to the platen from one of the feeding apparatus, preferably the document positioner.

Figure 3:
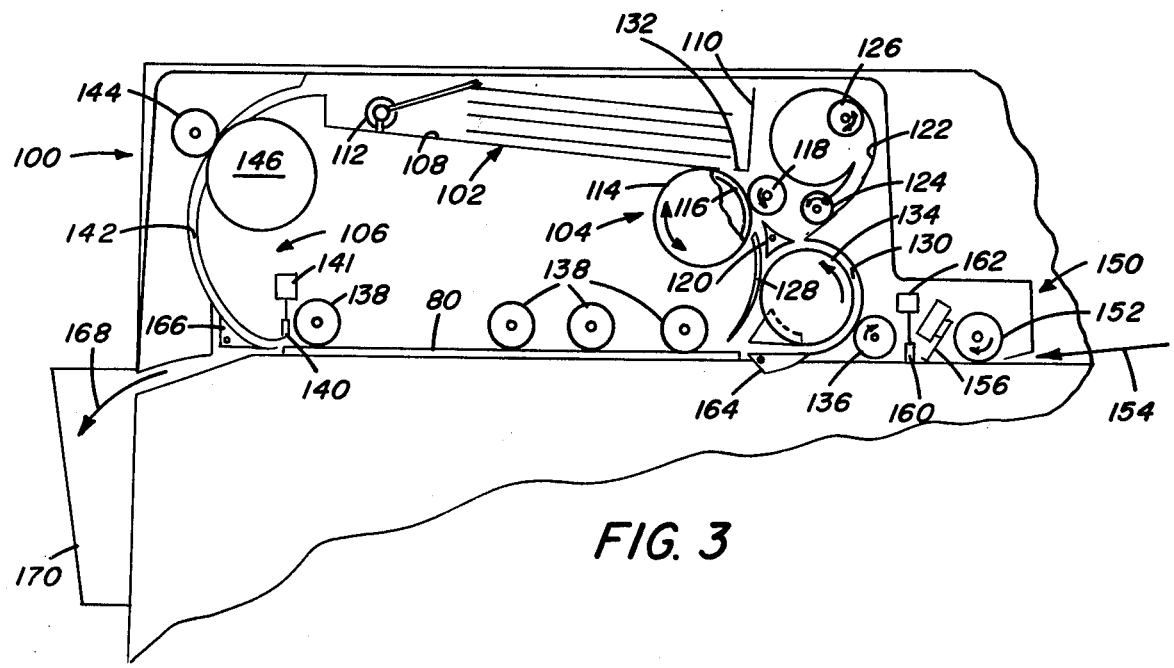
FIG. 3 is a cross-sectional view of a recirculating feeder and document positioner for feeding documents to the platen.

A combination recirculating feeder and document positioner of this invention is illustrated in FIG. 3 of the drawings and comprises a modification of a recirculating document feeder described in U.S. Pat. No. 4,158,500, which is based on the before-mentioned copending U.S. Pat. Application Ser. No. 768,666, the disclosure of which is incorporated herein by reference. Reference is made to U.S. Pat. No. 4,158,500 for a more complete description of the recirculating feeder disclosed therein.

The recirculating feeder is generally designated 100 and includes a hopper 102, a sheet presenting portion 104 and a sheet returning portion 106. The hopper receives a set of document sheets face up in their normal page-sequential order, the sheets are delivered one-after-another, last sheet first, from the bottom of the document set, and after copying the sheets are returned to the hopper, each sheet on top of previously delivered sheets. The sheet-presenting portion 104 removes the sheets sequentially from the bottom of the hopper, presents the removed sheet to the platen 80 for copying and, if both sidees of duplex documents are to be copied, then inverts and represents the other face of the sheet to the platen for copying. The sheet-returning portion 106 removes the sheet from the platen after both of its faces have been copied and returns the sheet to the hopper on top of the other sheets so that the original order of the document set is retained.

More specifically, the hopper 102 is located above and spaced from the platen 80 where it is readily accessible for receiving and supporting the set of original document sheets. The hopper comprises a tray 108 which is inclined to assist in aligning the document sheets against a forward wall 110 of the tray. A set-completed detector 112 determines, without counting, when (each time) the set of original sheets has been copied. Further details of the preferred hopper are illustrated and described in the previously mentioned U.S. Pat. Application Ser. No. 647,683, the disclosure of which application is hereby incorporated by reference into the present application.

The sheet presenting section 104 includes an oscillating vacuum pick-off device 114, a driving nip formed by ring 116 and back-up roller 118, and a sheet diverter 120. Section 104 also has a non-inverting guide path 122 that is generally in the shape of a snail shell, and two driving rollers 124 and 126 for moving documents sheets in both direction in the guide path. Section 104 also has means defining first and second sheet inverting paths 128 and 130, respectively.

More specifically, pick-off device 114 removes the sheets from an exit 132 at one end of the tray 108 and directs the removed sheet into a selected one of the inverting or noninverting paths 128 and 122, respectively, depending on the position of diverter 120. In the illustrated position the diverter directs a sheet into path 128. When moved counterclockwise, the diverter can deflect the sheet into path 122. As described more fully in the previously mentioned application Ser. No. 647,683, the sheets are removed by the vacuum pick-off device 114, which draws one end of the sheet out of the exit and then fed by device 114 into the driving nip between ring 116 and roller 118. This propels the sheet into the selected path.

When the bottom face of the document sheets are to be copied first (i.e., when duplex document sheets are to be copied), the diverter will first be positioned to deflect a removed sheet into the non-inverting path 122. The motive force of rollers 124 and 126 advances the sheet until the trailing end of the sheet clears the diverter. The diverter is moved and rollers 124 and 126 are then reversed to drive the sheet from the path 122 into path 128 and, with the assistance of roller 134, onto the platen 80.

In order to copy both sides of a document sheet, means are provided for removing the sheet from the platen, after the first face of the sheet has been copied, and inverting or turning the sheet over for copying its other face. This is accomplished by feeding the sheet from the platen into the inverting path 130, where it is advanced by the driving rollers 134 and 136 through 360 degrees and back onto the platen.

At the platen there are a plurality of reversible drive rollers 138 and a registration gate 140. On entering the exposure station at the platen, a document sheet is driven by the rollers 138 into a registered position against the gate. After the first face of the sheet is copied, the rollers are reversed, once to drive the sheet into the inverting path 130, and again to re-register the sheet against gate 140 for copying the second face. After the second face has been copied, the gate is removed by operation of an associated solenoid 141, and the rollers 138 drive the sheet into another sheet inverting path 142. Two drive rollers 144 and 146 on opposite sides of path 142 return the document sheet to the tray 102 on top of the set from which it originally was removed.

The feeder may be referred to as a recirculating feeder because the sheets move in the feeder repeatedly from the hopper to the exposure platen and back to the hopper. It may be referred to as a collating feeder because it is capable of feeding sheets to the platen in an appropriate sequence so that the copies produced will be collated without the need for a sorter. Also, the feeder can circulate document sheets in a manner suitable for generating either simplex or duplex copies from either simplex or duplex originals. For more details of the feeder structure previously described and its various modes of operation, reference is made to the beforementioned U.S. Pat. Application Ser. No. 768,666.

One feature of the present invention relates to modification of the recirculating feeder structure previously described and as set forth in the aforementioned Pat. Application Ser. No. 768,666 to include a document positioner, generally designated 150, which is suitable for feeding individual document sheets to platen 80 for copying one or more times and for then ejecting the document sheets from the platen along a non-recirculating path. The document positioner structure illustrated in the drawings comprises a drive roller 152 which is driven in a clockwise direction to advance sheets manually fed to the positioner along the path indicated by the arrow 154. The sheets thus advanced are moved past a suitable sensor, shown as a switch 156, which detects the presence of a sheet at the document feeder and ready to be fed to the platen 80. The sheets then engage a gate 160 which holds the document sheets against further movement until the gate is retracted (elevated) at the appropriate time. Operation of gate 160 is controlled by means of a solenoid 162 in the same manner as gate 140. When a sheet is to be fed to the platen from the document positioner, a sheet diverter 164 is swung from its illustrated position (where it guides sheets from the platen along the inverting path 130) to a lowered position (not shown) where its upper surface provides a guide for directing the sheet from the document positioner to the drive rollers 138. Rollers 138 deliver the sheet along the platen 80 to the gate 140. Another diverter 166 located adjacent gate 140 is normally in the position illustrated to deflect documents leaving the gate 140 upwardly along the return path 142 of the recirculating feeder. Deflector 166 can be pivoted counterclockwise to deflect a document sheet downwardly along a sheet path shown by the arrow 168 into a hopper 170.

As mentioned previously, the LCU receives input signals from various portions of the apparatus and effects control of such apparatus in a predetermined manner in accordance with the program of the computer 60. Thus there are a number of leads extending from sensors, set counters and the like in the recirculating feeder 100 and document positioner 150 that extend to the LCU, such leads being shown diagrammatically at 173 and 175, respectively in FIG. 1. In like manner there are leads extending from the LCU to various portions of the apparatus that are controlled by the LCU, such as solenoids, switches, drives and the like, such leads being shown diagrammatically at 177 for the feeder 100 and at 179 for the document positioner 150.

The number of sets of copies to be made from a document in the recirculating feeder 100 is furnished to the computer by means of a keyboard 180. Similarly, the number of copies to be made from a document sheet fed to the platen from document positioner 150 is furnished to the computer by means of a keyboard 182. With respect to information furnished to the computer for operation of the feeder 100, the machine operator will input data indicating the type of document sheets that are in the feeder, i.e., are copies to be made from simplex (one-sided) document sheets or from duplex (two-sided) document sheets. The operator should also indicate whether simplex or duplex copies are to be made from originals in feeder 100.

Figure 4:
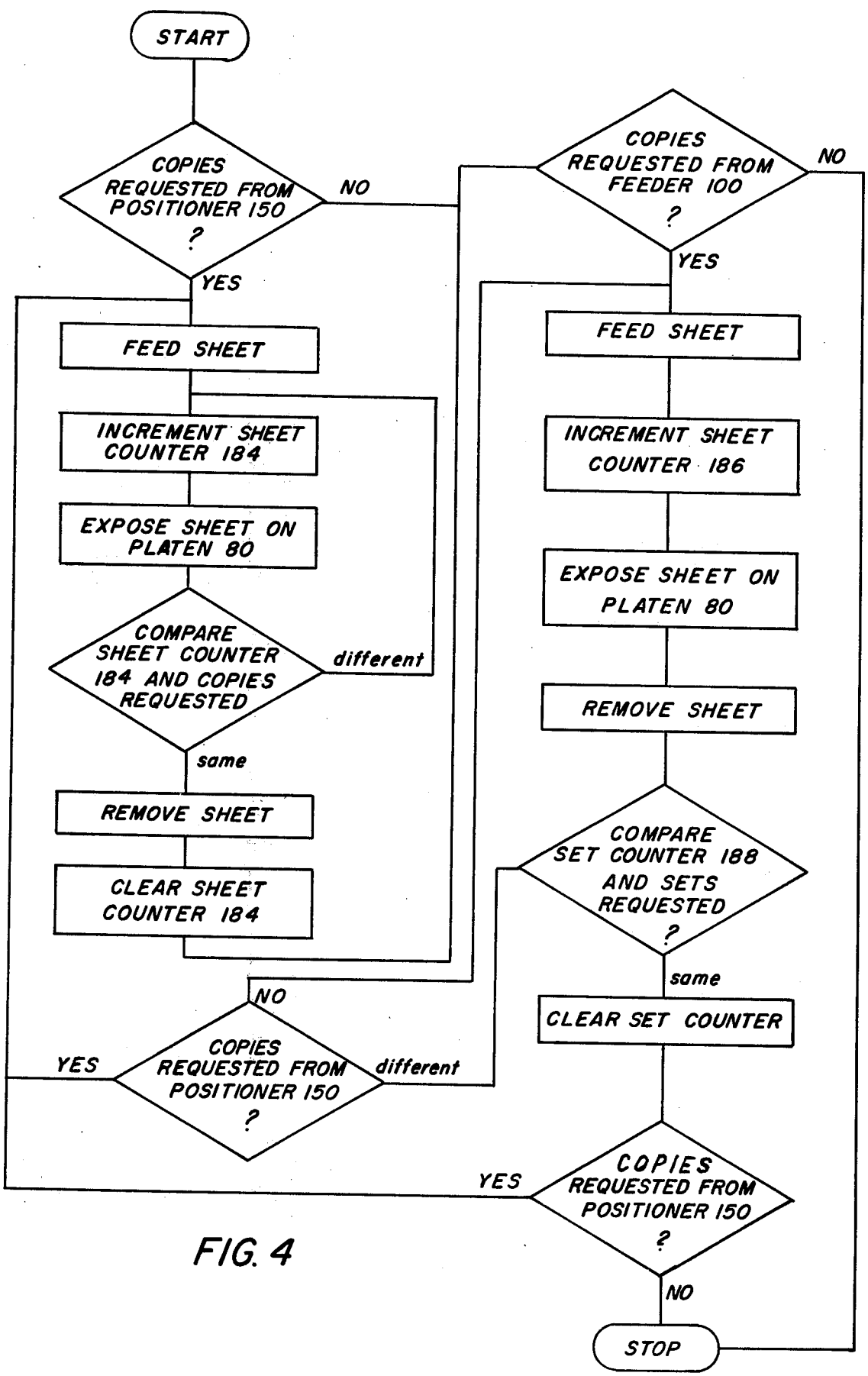
FIG. 4 is a flow chart presenting a logical sequence of operation for the copier of the present invention.

The apparatus of the invention previously described can be used to make copies either from the document feeder or from the document positioner based on data furnished to the computer by the operator. In this mode of operation the operator inputs the appropriate data through only one of the keyboards 180 and 182, and places the document sheet or sheets to be copied in the selected feeder apparatus. Thus the apparatus does not need to discriminate or give priority to jobs to be run from both feeders. With respect to operation of the recirculating feeder, the computer counts and totalizes the number of copy sets which are made. At the end of a copy job, the computer recognizes the concurrence between the number of switch actuations generated by the set counter 112 (which represents the number of sets of copies made) and the number of sets of copies requested by means of the keyboard 180. At that time the feeder is deactivated. Similarly, when documents are fed by means of the document positioner the computer keeps track of the number of copies made from a document sheet, and compares that to the number of copies requested by means of the keyboard 182. When the number of copy sheets corresponds with the number of copies requested, the document sheet is fed from the platen into tray 170 and the document positioner is deactivated. While this mode of operation is fully satisfactory, it is preferred that the machine be programmed in such a manner that documents to be copied can be furnished to the recirculating feeder and to the document positioner simultaneously, and the copier apparatus will automatically give precedence to copying of documents from one source or the other. FIG. 4 shows a flow chart which represents a logical operation of the copier of this invention to provide for preference for making copies of documents furnished to the platen from the document positioner 150 even if it requires interruption of the normal operation of a job being run from recirculating feeder 100. The flow chart shown in FIG. 4 will now be described in detail.

After the copier is started the LCU will determine if an operator has requested copies from document sheets to be fed from positioner 150. This will be determined by the LCU sensing a document sheet in the positioner via switch 156 and by receiving data from keyboard 182. Assuming initially that copies have been requested from positioner 150, the LCU will operate the document positioner 150 by means of the leads 179 and feed a sheet onto the platen. When the document is properly positioned on platen 80, the LCU will then increment a sheet counter 184 which functions to keep track of the number of times a document sheet on platen 80 is copied. Then, at the appropriate time as determined by signals received from the sensor 58 that senses the perforations in photoconductor 16, the lamps 84 are flashed to expose the document on platen 80 and project an image of the document onto the photoconductor. As a result, an image is formed on photoconductor 16, and this image is processed and transferred to a copy sheet, and then fused to the sheet in the manner explained hereinbefore. Preferably, the LCU positions sheet diverter 56 to deflect into hopper 42 copies of documents made from the document positioner.

Next the LCU compares the sheet counter 184 and the number of copies requested by the operator through keyboard 182. Assuming initially that the requested number of copies has not been made, the cycle is again repeated by incrementing the sheet counter 184, exposing the sheet on the platen 80 and again comparing the sheet counter 184 with the number of copies requested. When the sheet counter and the number of copies requested are in agreement, then the LCU energizes solenoid 141 to raise gate 140 and tilt diverter 166 to permit the rollers 138 to drive the document sheet from the platen along path 168. Then the sheet counter 184 is cleared.

When the sheet counter 184 is cleared, or if no copies have been requested from the positioner at the time the copier is started, then the LCU determines if copies have been requested from recirculating feeder 100. This can be determined from data furnished from keyboard 180. If copies have not been requested from feeder 100, then the machine cycle is stopped. If copies have been requested from feeder 100, then the LCU will energize the pick-off device 141 to bring about the removal of the bottom-most sheet from the document set in hopper 102, and its presentation to the platen 80 with its leading edge against registration gate 140 in position for copying. Thus the LCU will increment a sheet counter 186.

Using signals from sensor 58 again, the LCU determines the appropriate time for actuating the flash lamps 84 to effect copying of the document sheet at the platen. The image is projected onto the photoconductor, developed, transferred to a copy sheet, and fused to that sheet in the manner explained hereinbefore. When copies are being made from documents in the recirculating feeder, the LCU preferably operates sheet diverter 56 to furnish such copies to the finisher 46. However, it will be understood that copies from either feeder 100 or positioner 150 can be furnished to either the finisher 46 or to the hopper 42, and the operator can instruct the LCU to furnish copies to the finisher or to hopper 42 by providing suitable input through the keyboard of the copier.

After one side of the document on platen 80 has been exposed, the LCU will either cause the feeder to drive the document sheet through inverter path 130 (if duplex copying has been requested) or it effects removal of the registration gate 140 so that the sheet is driven from the platen and back onto the top of the stack of sheets in the supply hopper 102. The LCU then determines if additional copies are required by comparison of a set counter 188 and the number of sets of copies requested from feeder 100. Assume initially that the LCU determines that additional copies are to be made from document sheets in recirculating feeder 100. Before proceeding with copying of additional document sheets in feeder 100, the LCU again will determine if copies have been requested from positioner 150. If such copies have been requested then the LCU will return to copying documents from positioner 150 by feeding a sheet onto the platen, incrementing the sheet counter 184, exposing the sheet on the platen, etc. in the manner previously described. When the sheet counter 184 coincides with the number of copies requested from positioner 150, the LCU will again return to the incompleted job in the recirculating feeder 100. Then another sheet from the recirculating feeder will be fed, counted, exposed and removed as previously described. This operation continues until such time as the required number of sets of copies have been completed as indicated by a comparison of the set counter 188 and the number of sets requested. At this time the set counter will be cleared. The LCU will once more determine if additional copies have been requested from positioner 150. If the answer is yes, then the cycle for copying a document from positioner 150 will be repeated again. If the answer is no, then the machine copying cycle will be stopped by the LCU.

In the process of making copies of documents from the recirculating feeder 100, it is preferred that the LCU keep track of the number of documents fed from the hopper 102 each time a set is made, and this number be compared to the number in the next set made. Thus counter 186 will count the number of documents in the first set by receiving a signal from a switch (not shown) each time a document sheet of a set is fed to the platen. That information will be stored temporarily in the LCU until such time as the second set is made. When the second set is completed, as indicated by the actuation of a switch associated with set detector 112, the number of document sheets circulated during the making of the second set of copies will be compared to the number of document sheets circulated during the making of the first set of copies. If the numbers are different, it will indicate that multiple-feed of document sheets has occurred when one or the other of the sets was copied, and the LCU will shut down the recirculating feeder and provide a suitable signal advising the operator of this inconsistency. In the event the number of documents circulated in each set coincides, the LCU will continue the copying program, again monitoring the number of document sheets circulated in each set and comparing them with the preceeding and succeeding sets. If double-sheet feed detection is not required, then the sheet counter 186 may be omitted. The double-sheet feed protection mode of operation is described more fully in commonly assigned U.S. Pat. No. 4,076,408 issued on Feb. 28, 1978 in the names of M. G. Reid et al and entitled COLLATING DOCUMENT FEEDER WITH MULTIPLE FEED DETECTOR.

As will be apparent from the foregoing description, the LCU monitors the various operations of the copier/duplicator and feeder apparatus together with requests for copies as received from the keyboards in accordance with the program set forth in FIG. 4 so that there is a preference for feeding and exposure of a document from the document positioner 150. The program also insures that documents sheets are not fed to the platen from both the recirculating feeder 100 and the document positioner 150 simultaneously. As a result of this programming and the apparatus of the invention the copier can be used for running both relatively long jobs of multi-sheet documents from the recirculating feeder and relatively short jobs comprising copying one or only a few document sheets manually fed to the document positioner 150. This enables the use of both document feeders without loss of the maximum copying process rate. In other words, a document sheet can be furnished to the platen for copying each time there is a frame available on the photoconductor 16 so that copying at the maximum machine speed can be realized. It also permits the photoconductor to be imaged with different jobs interposed with each other and still furnish copies of such jobs from the process section of the copier to different delivery points via diverter 56 so that the copies are not intermixed. In addition, while a job is being run on the recirculating feeder a second job can be prepared for running on the recirculating feeder by making paste-up originals or the like as explained hereinbefore and then feeding such originals through the document positioners 150 to make a master copy suitable for use in the recirculating feeder. This not only provides maximum utilization of the copier but also minimizes the total operator time required for running several jobs in order. Furthermore, since the recirculating feeder 100 may be used for running long jobs of multi-sheet documents that take a substantial length of time, one can still obtain a fast "turn-around" time on relatively short jobs by utilizing the document positioner. This is accomplished without unduly complicating the task for the operator as would be required if the operator needed to manually interrupt the operation of the document feeder 100, run the second (short) job and then restart the document feeder after recalculating the number of sets or copies remaining to be made. Moreover, reliability of the copier apparatus is increased by the tandem utilization of both feeding apparatus in parallel and in the controlled sequence described because such minimizes machine starts and stops which adversely affects reliability of the apparatus.

While not specifically mentioned hereinbefore, it will be apparent to those skilled in the art that the computer can be programmed so that documents copied from the recirculating feeder are copied on paper in either of the supplies 38 or 40 and documents copied on the document positioner 150 are copied on the other paper supply. This permits one size paper (e.g., "letter" size) to be in one of the paper supplies and another size paper (e.g., "legal" size) to be in the other paper supply. This feature is especially desireable in those instances when the apparatus is utilized for making masters of a second job on one size paper while the recirculating feeder is being used to make copies on a different size paper.

The invention has been described in detail with particular reference to a preferred embodiment thereof, however, it will be understood that variations and modifications can be effected within the spirit and scope of the invention as described hereinabove and as set forth in the appended claims.

I claim:

1. Apparatus for feeding document sheets to an exposure station for copying from two spaced locations comprising: means defining a plurality of sheet paths extending from the locations to the exposure station, means for feeding document sheets to the exposure station along each of said paths, and control means for operating said feeding means, said control means including means responsive to the presence of document sheets at both locations for operating the feeding means in a programmed order providing preference for feeding of document sheets to the exposure station for copying first from one location and then from the other location.

2. Document copying apparatus for copying document sheets provided to the apparatus at a first location or at a second location, the apparatus comprising: a platen for receiving document sheets from both locations, means defining spaced paths extending to said platen from the first location and the second location, means for feeding document sheets to the platen along said paths, means for making a copy of a document sheet received on said platen, and control means for operating said feeding means in a programmed sequence, the control means comprising a programmed logic and control unit including means for receiving input signals indicative of the number of copies to be made from document sheets awaiting copying at the first location and the number of copies to be made from document sheets awaiting copying at the second location, and the logic and control unit including means for generating output signals to operate said feeding means in a programmed manner which provides preference for copying of document sheets from one of the locations.

3. Apparatus for selectively copying document sheets from two different sources, the apparatus comprising:
   a platen;
   means for copying a document sheet at the platen;
   a recirculating sheet feeder having a tray for receiving document sheets to be copied and means for sequentially circulating sheets from the tray to the platen and back to the tray;
   a document positioner having means for feeding a document sheet to the platen for copying and for feeding the sheet away from the platen along a non-recirculating sheet path; and
   control means comprising a programmed logic and control unit for receiving input signals indicative of the number of copies to be made from a document sheet at the document positioner, and the control means includes means for temporarily interrupting the copying of document sheets in the recirculating feeder to copy a document sheet at the document positioner and then return to copying of document sheets at the recirculating feeder.

4. Apparatus as set forth in claim 3 wherein said recirculating sheet feeder comprises means defining an inverting sheet path, means for feeding a document sheet from the platen through said inverting path and back to the platen, thereby to present both faces of a sheet to the platen for copying, and sheet diverter means movable between first and second positions and being located with respect to said inverting path and said document positioner so that when said diverter means is in its first position it can deflect a document sheet into said inverting means and when said diverter means is in its second position it can direct a document sheet from said positioner onto the platen.

5. Apparatus as set forth in claim 3 further comprising a sheet diverter located adjacent said platen and movable between (1) a first position wherein the diverter is effective to deflect a document sheet leaving the platen into a path leading to the tray of the recirculating feeder and (2) a second position wherein the diverter is effective to deflect a document sheet leaving the platen into a non-recirculating path, and said control means being responsive to the input signals to locate the diverter in its first position when copies are to be made from document sheets in the recirculating feeder and to locate the diverter in its second position when copies are to be made from a document sheet in the document positioner.

* * * * *